United States Patent
Lindenmeier et al.

(10) Patent No.: US 7,564,416 B2
(45) Date of Patent: Jul. 21, 2009

(54) ANTENNA FOR RADIO RECEPTION WITH DIVERSITY FUNCTION IN A VEHICLE

(75) Inventors: Heinz Lindenmeier, Planegg (DE); Stefan Lindenmeier, Gauting-Buchendorf (DE); Jochen Hopf, Haar (DE); Leopold Reiter, Gilching (DE)

(73) Assignee: Delphi Delco Electronics Europe GmbH, Bad Salzdetfurth (DE)

( * ) Notice: Subject to any disclaimer, the term of this patent is extended or adjusted under 35 U.S.C. 154(b) by 0 days.

(21) Appl. No.: 12/045,556

(22) Filed: Mar. 10, 2008

(65) Prior Publication Data

US 2008/0218422 A1 Sep. 11, 2008

(30) Foreign Application Priority Data

Mar. 9, 2007 (DE) .................. 10 2007 011 636

(51) Int. Cl.
*H01Q 1/32* (2006.01)
(52) U.S. Cl. ...................................... 343/713
(58) Field of Classification Search ................. 343/711, 343/713, 715, 704
See application file for complete search history.

(56) References Cited

U.S. PATENT DOCUMENTS 4,914,446 A 4/1990 Lindenmeier et al.

(Continued)

FOREIGN PATENT DOCUMENTS

| DE | 36 18 452 | 12/1987 |
| DE | 37 19 692 | 12/1988 |
| DE | 39 14 424 | 12/1990 |

*Primary Examiner*—Hoang V Nguyen
(74) *Attorney, Agent, or Firm*—Collard & Roe, P.C.

(57) ABSTRACT

Antenna for radio reception, which is disposed, for reception of frequencies above the high-frequency range, in a motor vehicle window, in an electrically conductive vehicle body, together with an imprinted heating field, which field extends into the vicinity of the upper window edge, and comprises horizontally disposed heating conductors and bus bars situated at the side edges of the heating field, for supplying the direct current for heating by way of high-frequency-insulating uncoupling networks, whereby at least one antenna is formed by means of connecting this heating field to an antenna connection contact, by way of a conductor. A rod antenna with an antenna connection contact in the antenna foot point, with electrical through-coupling of the reception signals into the vehicle interior, is present on the outer skin of the vehicle and affixed in the vicinity of the upper window edge, for the reception of signals both for low frequencies and above the high-frequency range. The antenna connection contact of the rod antenna and the at least one antenna connection contact on the motor vehicle window pane, as well as the ground connection to the metallic vehicle body, are combined in the spatial region of an antenna connection point of at least two diversity antennas, for frequencies above the high-frequency range, and the geometrical expanse of this antenna connection point is smaller than $\frac{1}{15}$ of the wavelength in this frequency range. An antenna module is present within the region of the antenna connection point, in which all the electronic components required for signal amplification in both frequency ranges are contained, and to which module the reception signals of the antenna connection contacts are passed by way of connection lines, and to the ground connection, and whose output signals in both frequency ranges are passed to a receiver, by way of a shielded HF line.

19 Claims, 12 Drawing Sheets

U.S. PATENT DOCUMENTS

| | | |
|---|---|---|
| 5,097,270 A | 3/1992 | Lindenmeier et al. |
| 5,714,959 A * | 2/1998 | Troy et al. .................. 343/713 |
| 5,719,585 A * | 2/1998 | Tabata et al. ................ 343/713 |
| 5,898,408 A * | 4/1999 | Du ............................. 343/715 |
| 5,933,119 A * | 8/1999 | Fujii et al. .................. 343/713 |
| 6,130,645 A * | 10/2000 | Lindenmeier et al. ....... 343/704 |
| 6,208,303 B1 * | 3/2001 | Tachihara et al. ........... 343/704 |

* cited by examiner

ANTENNA FOR RADIO RECEPTION WITH DIVERSITY FUNCTION IN A VEHICLE

CROSS REFERENCE TO RELATED APPLICATIONS

This application claims priority from German Patent Application Serial No. 102007011636.7 filed on Mar. 9, 2007 the disclosure of which is hereby incorporated herein by reference.

BACKGROUND

The invention relates to an antenna for radio reception, which is disposed, for reception of frequencies above the high-frequency range, in a motor vehicle window. This antenna is disposed together with an imprinted heating field, wherein this field extends into the vicinity of the upper window edge 12, with horizontally disposed heating conductors and with bus bars situated at the side edges of the heating field, for supplying the direct current for heating by way of high-frequency-insulating uncoupling networks. There is at least one antenna which is formed by means of connecting this heating field to an antenna connection contact by way of a conductor.

Antennas of this type are known, for example, from DE 3618452.A1 which has a corresponding patent U.S. Pat. No. 4,914,446 to Lindenmeier et al the disclosure of which is incorporated herein by reference, and from the examined patent published for public scrutiny DE 3719692 A1. In the case of these antennas, the heating field(s) on a window is/are also utilized for the reception of signals in the meter wave range, i.e. the frequency range above 30 MHz, in other words above the high-frequency range. In at least one embodiment, the antenna connections for forming diversity antennas are situated on the bus bars, in each instance, and on a point of the metallic frame that generally surrounds the entire window pane, in the form of the conductive car body, which point is adjacent to the connection point on the bus bar. In this connection, the possibility of capturing reception signals that differ from one another, for further processing in an antenna diversity system, at different locations of the bus bars and the frame, is utilized. In the case of a single-pane window, the antenna conductors and the heating conductors are conductors imprinted on the glass. To create the possibility of forming additional diversity antennas by means of electrical connections to the heating field, it is proposed in DE 3914424 C2 (which has a corresponding U.S. Pat. No. 5,097,270 which issued on Mar. 17, 1992 the disclosure of which is hereby incorporated herein by reference in its entirety) to form antenna connectors that are in part guided crosswise to the heating conductors, within the heating field, with which the antenna conductors are connected at low ohms at the intersection points. For high-frequency-type uncoupling of the bus bars from the on-board network, by way of which the direct current for heating is supplied, suitable uncoupling networks are therefore used, as they can be seen, for example, in DE 3618452, FIG. 7, blocks 6a, b, c, d, and in DE 3719692 A1, FIG. 1, blocks 6a, b, c, d. These uncoupling networks must be structured in high-ohm manner for the frequency range. This is possible with acceptable costs above the high-frequency range. At lower frequencies, the high impedance of such uncoupling networks can only be achieved at high cost and a relatively great space requirement for these networks, because of the high heating currents.

SUMMARY

Antennas for AM/FM radio reception in vehicles, with antenna diversity for the USW [ultra-short wave] frequency range, have been known for many years, but have only been common for the vehicles of higher price classes until now. Such vehicles, because of their size, generally have rear window panes with large dimensions, which allow forming a separate structure for reception in the low LMS frequency range, above the heating field, and thus make it possible to configure an inexpensive antenna for this frequency range. In contrast to this, diversity technology was not able to become common for radio antennas of smaller vehicles, mainly because the heating field cannot be utilized for LMS reception in cost-advantageous manner. Instead, antenna diversity systems having multiple antenna modules, disposed in decentralized manner, were created, requiring great effort and expenditure for HF lines and plug connections. The present invention is therefore primarily aimed at configuring a high-performance but nevertheless inexpensive antenna for AM/FM radio reception with antenna diversity function, in vehicles, for the USW frequency range. In automobile construction, it has been shown that high costs occur particularly from the number of modules that must be affixed at different assembly locations, and from the required cable expenditure, with the related plug connections. In contrast to this, a greater expenditure for electronic means leads to relatively low costs, particularly at high numbers. The present invention brings with it the advantage that a high-performance antenna for AM/FM radio reception in vehicles, with antenna diversity, can be inexpensively configured with minimal expenditure for mechanical components, and thus is suitable also for use in small vehicles.

It is therefore the task of the present invention, in the case of an antenna of the type stated, to achieve reception of low radio frequencies (LMS), in particularly cost-advantageous manner, with simultaneously good diversity function above the high-frequency range (VHF . . . ).

This task is accomplished, according to the invention, by means of an antenna system for radio reception, being disposed in a motor vehicle window. The antenna system comprises an imprinted heating field formed in the motor vehicle window. The antenna system comprises a plurality of heating conductors and at least one antenna formed by connecting the imprinted heating field to at least one antenna connection contact via at least one conductor of the plurality of heating conductors. In this embodiment there is a rod antenna coupled to the imprinted heating field via at least one additional antenna connection contact. There is also an electrical through coupling positioned on an outer surface of the motor vehicle window for conveying reception signals into the motor vehicle interior, for reception of signals both for relatively low frequencies and above a high frequency range. There is also an antenna connection point region having a diameter that is smaller than $\frac{1}{15}$ of a wavelength in the high frequency range, wherein the at least one antenna connection contact, and the at least one additional connection contact are disposed within the antenna connection point region. There is also a ground connection to the motor vehicle body disposed in the antenna connection point region, and an antenna module disposed within the antenna connection point region, the antenna module comprising electronic components required for signal amplification in both the relatively low frequency (AM radio frequency range) and above the relatively high frequency range, (above 30 MHz) for example FM radio frequency reception range wherein reception signals from the at least one antenna connection contact and the at least one additional antenna connection contact are passed. This embodiment includes a plurality of connection lines for allowing the reception signals from the at least one antenna connection contact and the at least one additional antenna connection contact to flow to the antenna module, wherein said reception signals are also passed to said ground connection. The system can also include a shielded HF line for passing output signals in both the relatively low frequency range and the relatively high frequency range to the antenna module.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION

Figure 1:
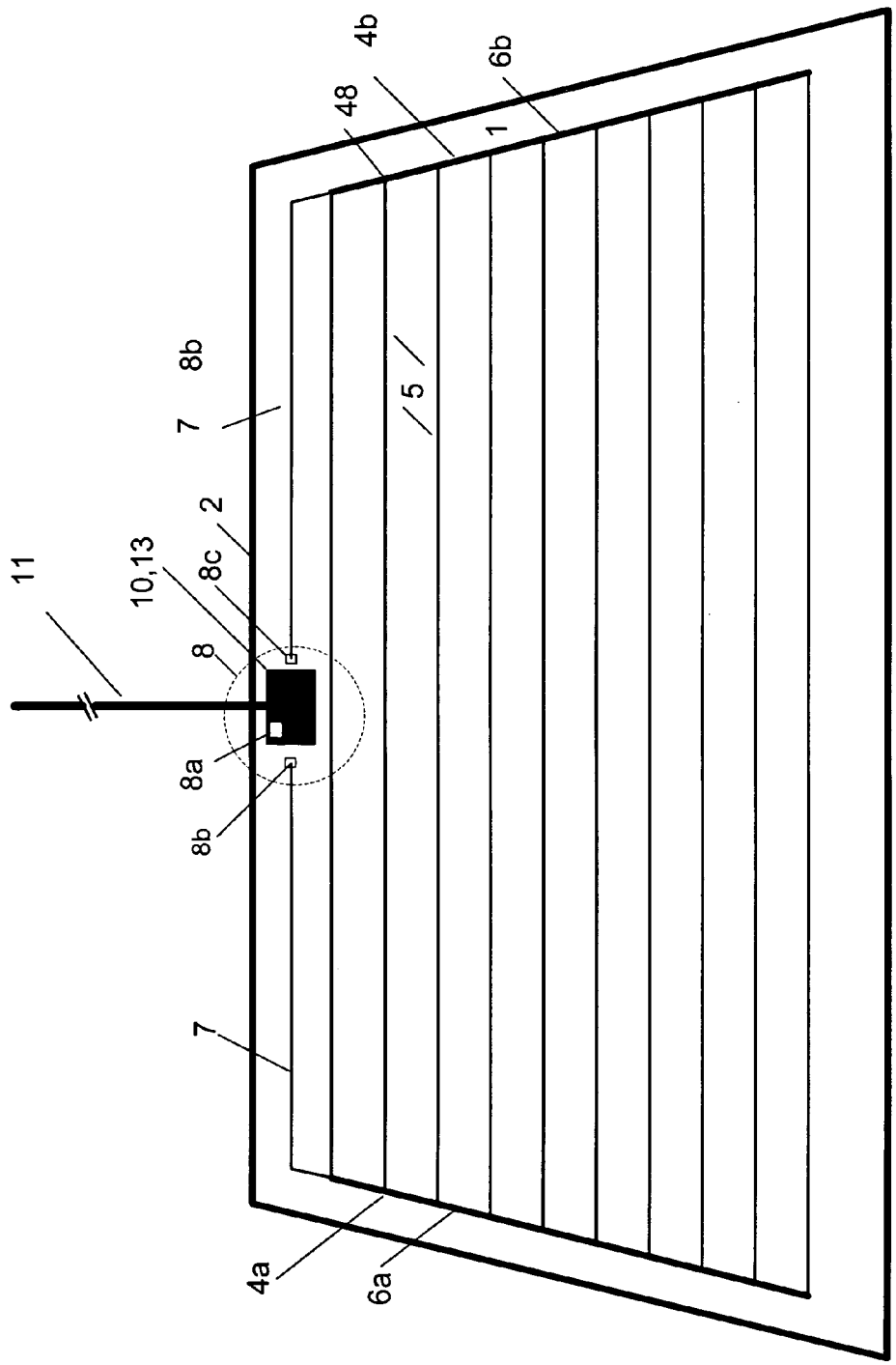
FIG. 1 is an antenna system with antennas for the frequency range above the high-frequency range by means of connections to the bus bars of the heating field.

Referring in detail to the drawings, FIG. 1 shows an antenna system formed in a heating field 5 in a window pane 1. The window pane is surrounded by a conductive vehicle body 2. The heating field forms with antennas for the frequency range above the high-frequency range by means of connections to the bus bars 4a, 4b of the heating field. This antenna system includes antenna conductors 6a and 6b and feed lines by way of conductors 7 to the antenna connection contacts 8b, 8c, as well as a rod antenna 11 situated on the window pane 1 of the vehicle, with a planar conductive antenna foot point 13, with capacitive through-coupling 10, and antenna connection contact 8a. All the antenna connection contacts 8a, 8b, 8c are spatially combined into an antenna connection point 8.

Thus, one embodiment of the present invention relates to the use of a simple rod antenna 11 with its antenna connection contact 8a in the antenna foot point, in the vicinity of the upper window edge, and that all the antenna signals are brought together in the spatial region of the area designated as the antenna connection location 8, in which all the antenna connection contacts 8a, 8b, 8c, 8d of the individual diversity antennas are structured. The foot point of the rod antenna 11 therefore lies in the spatial region of the antenna connection point 8, and the signals of the USW range obtained from the connections from the heating field are passed to the antenna connection contacts 8b, 8c, 8d situated on the window pane, within the spatial region of the antenna connection point 8, into the vicinity of the foot point of the rod antenna, by way of conductors 7. The antenna module 22 that contains all the electronic components required for signal amplification in both frequency ranges such as in the low frequency range such as the AM radio frequency range and above the high frequency (above 30 MHz) range or in at least one embodiment in the FM radio frequency range. The antenna module 22 for the antenna diversity function is also affixed within the region of the antenna connection point 8 and disposed within an interior region of an auto. Because of this feature the geometric expanse of this antenna connection point 8 is selected to be smaller than 1/15 of the wavelength in the USW range, wherein the feed lines between the antenna connection contacts 8a, 8b, 8c, 8d and the antenna module 22 turn out to be so short, in comparison with the wavelength for frequencies above the high-frequency range (USW frequencies), that their low frequency dependence can be included in the design of the amplifiers situated in the antenna module 22, and electronic components are not used outside of the antenna module 22. This is a significant contribution to configuring a cost-advantageous radio antenna with diversity function, which can be considered for use in vehicles of the lower price class.

In the case of some particularly advantageous construction forms of antennas, the rod antenna 11 is affixed to the rear window as shown in the top view of FIG. 1, and its reception signal is capacitively coupled, in essentially known manner, to a capacitive counter-surface 14 with antenna connection contact 8a, affixed to the inside of the window pane 1, by way of a planar conductive antenna foot point 13. The antenna directivity diagram of the signal existing at the bus bar 4a, b is available at the antenna connection contact 8b, 8c by means of connecting a conductor 7 to the upper end of a bus bar 4a, b and by passing this conductor 7 parallel and as close as possible to the conductive upper window edge, to the antenna connection contact 8b, 8c in the region of the antenna connection point 8. Because of the different positions of the two bus bars 4a, b in the vehicle, the antenna directivity diagrams present at the antenna connection contacts 8b, 8c are therefore different and can be used for the diversity function. The directivity diagram of the rod antenna 11 at the antenna connection contact 8a is clearly different from the antenna directivity diagrams of the two bus bars 4a, b.

Figure 2:
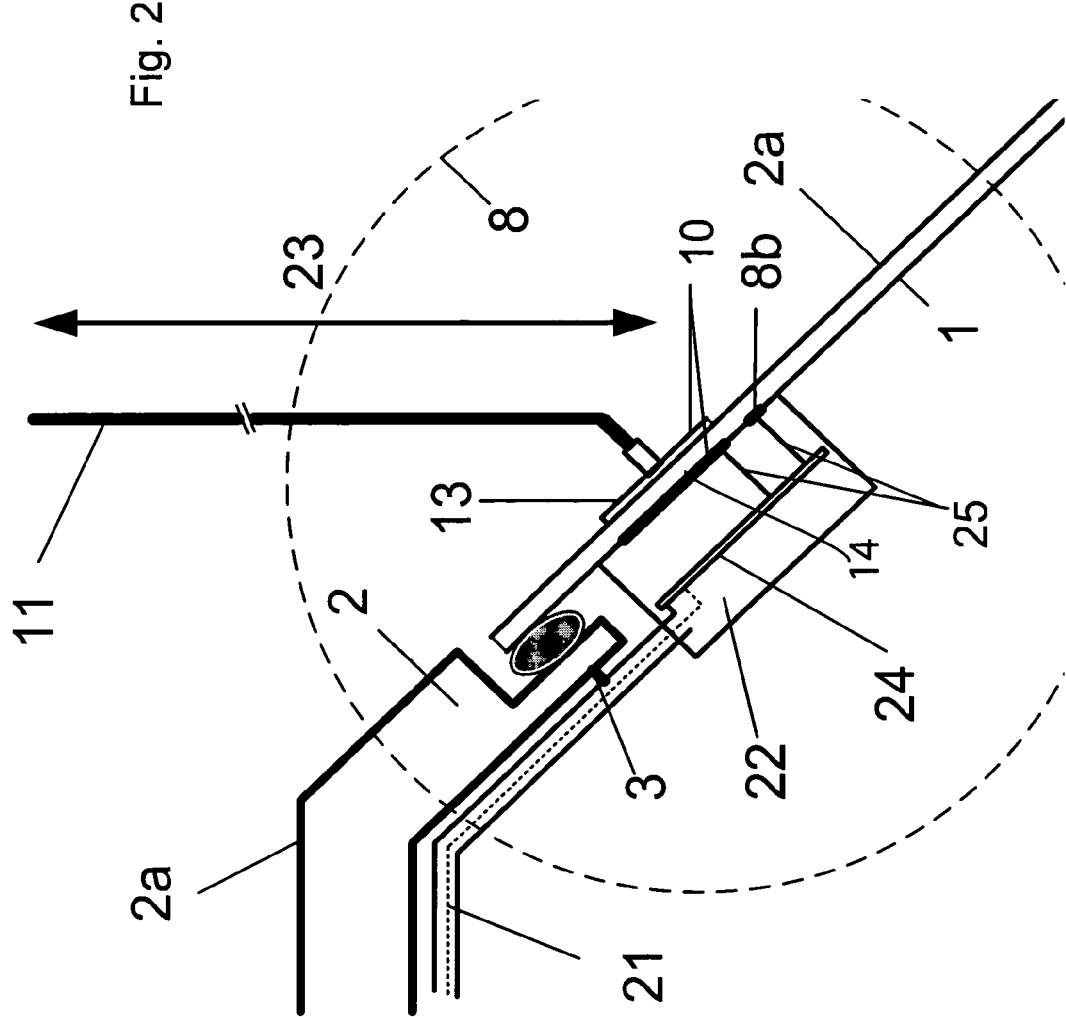
FIG. 2 is a cross sectional view of the antenna system shown in FIG. 1, with an antenna module attached on the inside of the window pane, with conductive connections from the antenna connection contacts to the electronic components.

FIG. 2 shows a side cross-sectional view of the antenna embodiment shown in FIG. 1. In this view, a windowpane 1 having an outer surface 2a is mounted on a motor vehicle body 2. A rod antenna 11 is coupled to a planar conductive antenna foot print 13 wherein there is through coupling of the signals from antenna foot print 13 to through coupling plate 10. There is also an antenna connection contact 8b disposed adjacent to through coupling plate 10. A plurality of conductive connections 25 electrically connect plate 10 to circuit board 24 in antenna module 22. In addition a shielded HF line 21 extends from circuit board 24 past ground connection 3.

The negligible expenditure of lines required for implementing an antenna according to the invention for radio reception with diversity function can be seen in the side view of the assembly in FIG. 2. However, this presupposes that advantage is taken of the known measures of multiple use of the shielded HF line 21, and that both the signals required for the diversity function, between the receiver 44 (See FIG. 9) and the antenna module 22, and the direct current for operation of the module, are passed by way of this shielded HF line 21. Recent developments of electronic modules for such applications possess a high degree of miniaturization, so that the antenna module 22 can be affixed in the region of the black imprinting, without significantly covering the window pane. The rod antenna 11 can be configured, for example, in simple form, as a steel rod having a rod length 23 between 20 and 40 cm. The area required for capacitive through-coupling 10 is approximately 6-8 cm2, and is acceptable even for small window panes. The ground connection 3 to the conductive vehicle body 2 can be made in simple manner, for example, using a cable clamp within the region of the antenna connection point 8. An antenna module 22 having a small geometrical configuration can also be attached to the metallic frame of the window, just as successfully, thereby making it possible to structure the ground connection 3, at the same time. A multiple line for a plug connection at one end can be firmly connected with the antenna connection contacts 8a, 8b, 8c, 8d situated on the window pane, for example imprinted on a kapton tape. The plug connection is closed during assembly of the antenna module 22.

Figure 3:
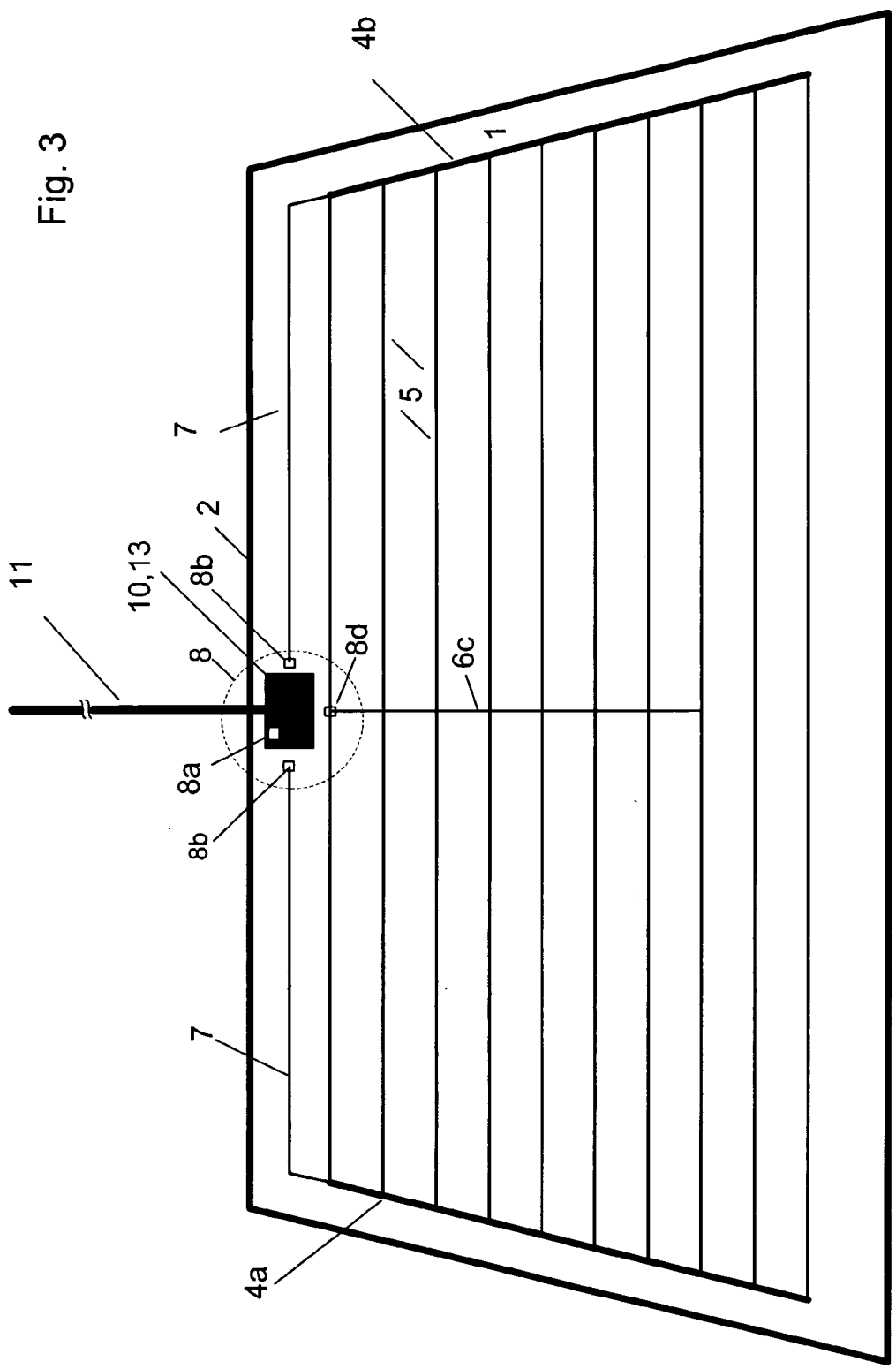
FIG. 3 is an antenna according to the invention as in FIG. 1, but with an additional antenna conductor passed crosswise to the heating conductors.

Affixing the rod antenna 11 in the horizontal center of the window pane, as shown in FIGS. 1 to 3, makes it possible to increase the diversity efficiency by introducing another antenna conductor (first conductor part) 6c, (See FIG. 3) which is guided crosswise to the heating conductors 5 and connected to the heating conductors 5 at the intersection points, to form another diversity antenna with antenna connection contact 8d. Thus, with the antenna connection contact 8a, 8b, 8c, 8d, diversity antennas with different directivity diagrams and a correspondingly high diversity efficiency are made available, in particularly simple and cost-advantageous manner.

Figure 4:
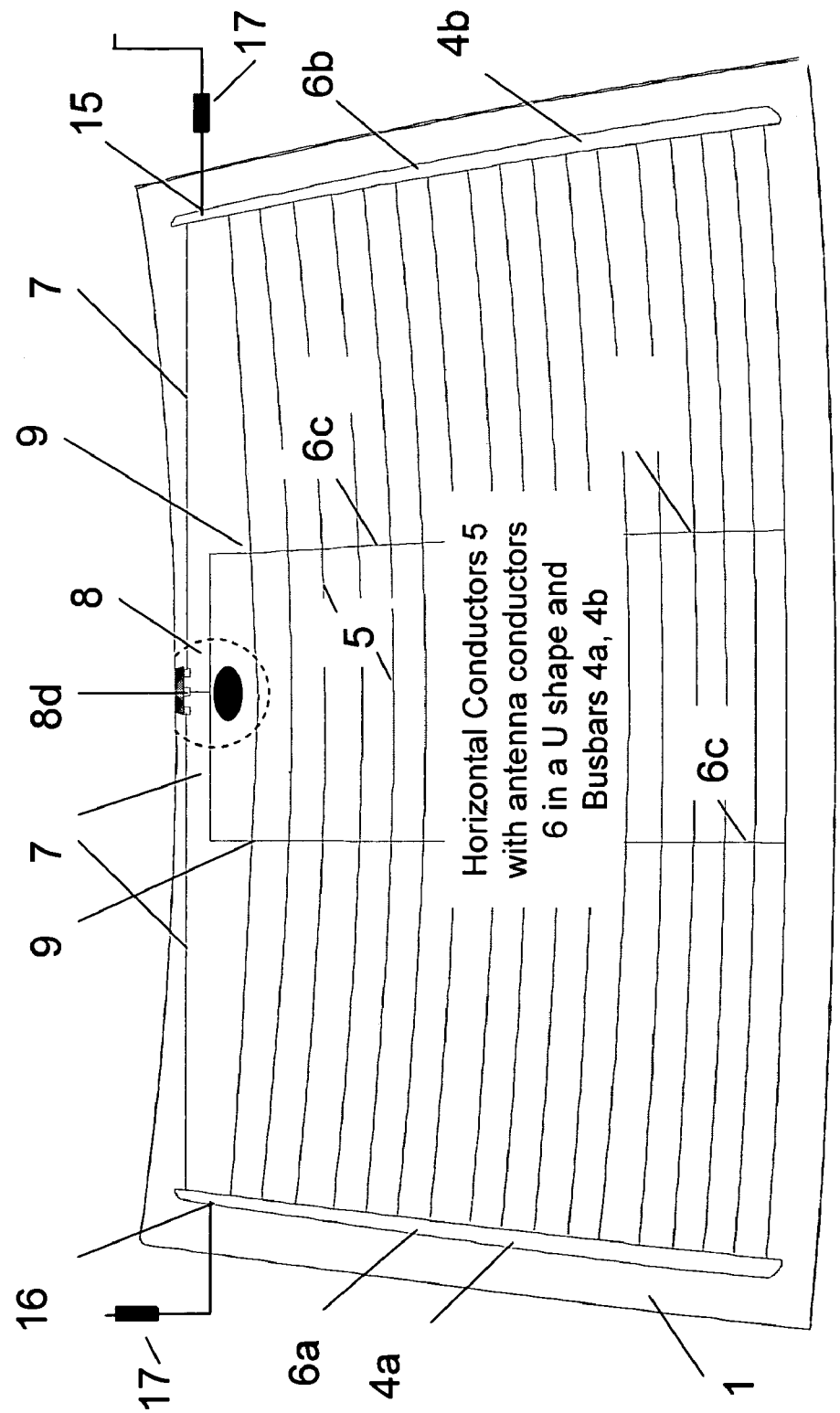
FIG. 4 is a schematic block diagram of an antenna configuration as in FIG. 3, but with two antenna conductors guided parallel to one another, crosswise to the heating conductors.

To improve the antenna properties of the antenna formed by the antenna conductor 6c in FIG. 3, it frequently proves to be advantageous to configure two antenna conductors 6c, guided parallel to one another and crosswise to the heating conductors 5, as shown in FIG. 4, which are brought together from the connection point 9 to the antenna connection contact 8d by way of conductors 7. In this figure, the uncoupling networks 17 are shown, which are generally required for high-frequency-type insulation of the bus bars 4a, b in the USW range and, if applicable, the TV range, for supplying the heating current to the bus bar connections 15, 16.

Figure 5:
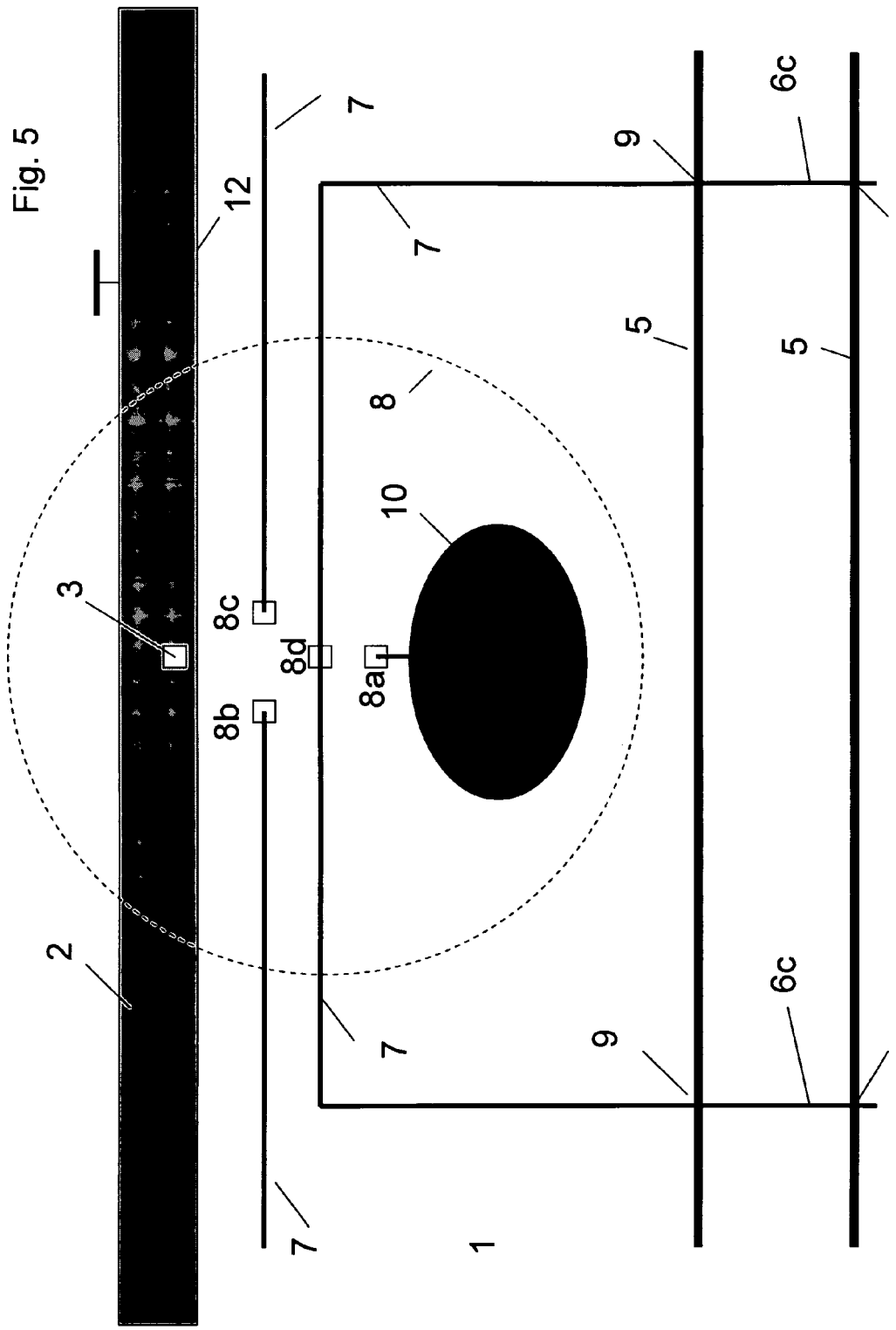
FIG. 5 is a schematic block diagram of an antenna configuration as in FIG. 4, with a representation of the antenna connection contact of the rod antenna connected to the capacitive through-coupling, and of the ground connection on the conductive vehicle body.
Figure 6:
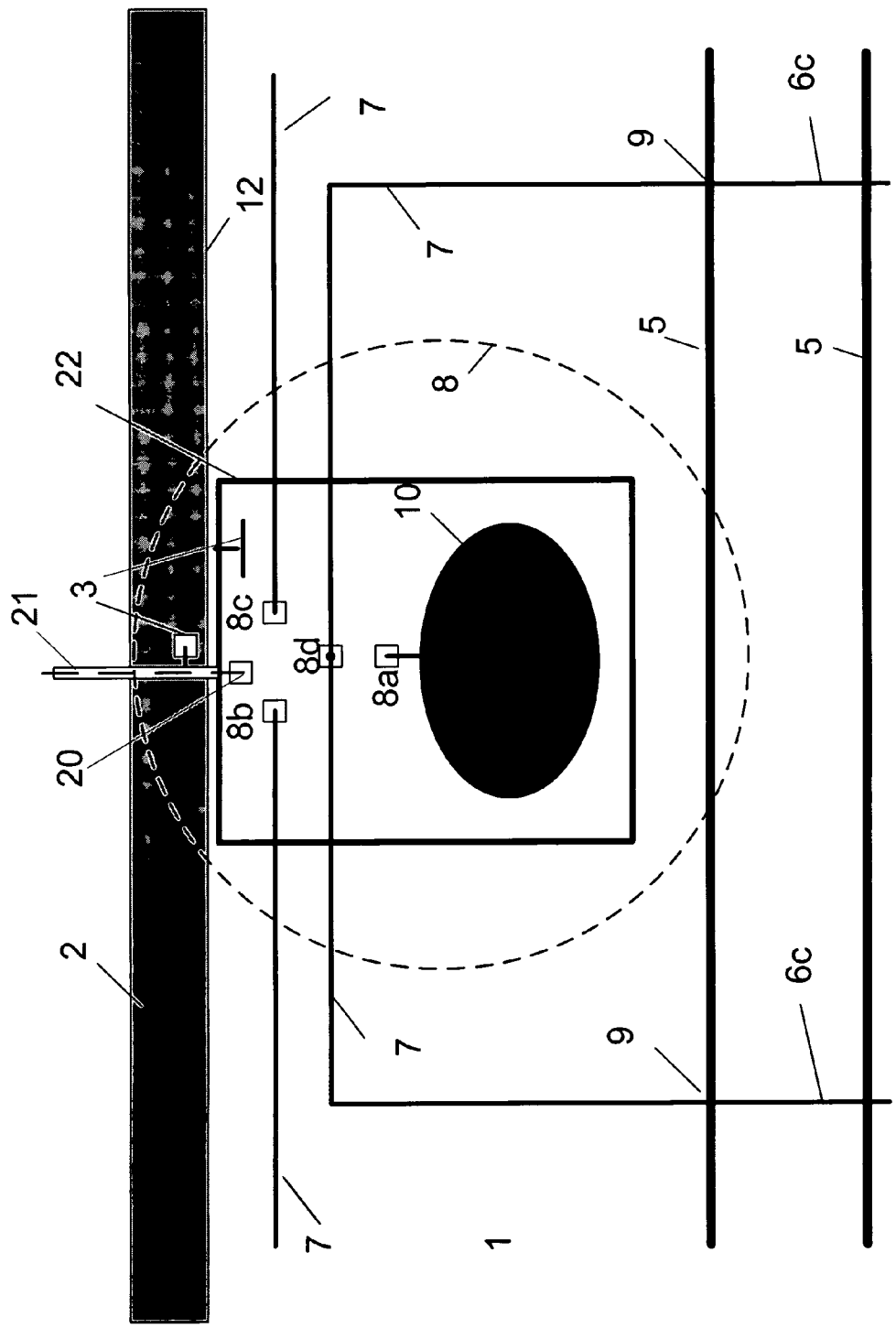
FIG. 6 is a schematic block diagram of an antenna configuration as in FIG. 5, with the antenna module and ground connection shown within the geometric region of the antenna connection point.

FIG. 5 shows a detailed representation of the antenna configuration as shown in FIG. 4, with a representation of the antenna connection contact 8a of the rod antenna 11, connected with the capacitive through-coupling 10, and of the ground connection 3 on the conductive vehicle body 2. All the antenna connection contacts 8a, 8b, 8c, 8d are situated within the geometric region of the antenna connection point 8. FIG. 6 shows, as an example, how the antenna module 22 is affixed, with the shielded HF line 21 connected with the output connection 20, with the shield grounded on the ground connection 3.

Figure 7:
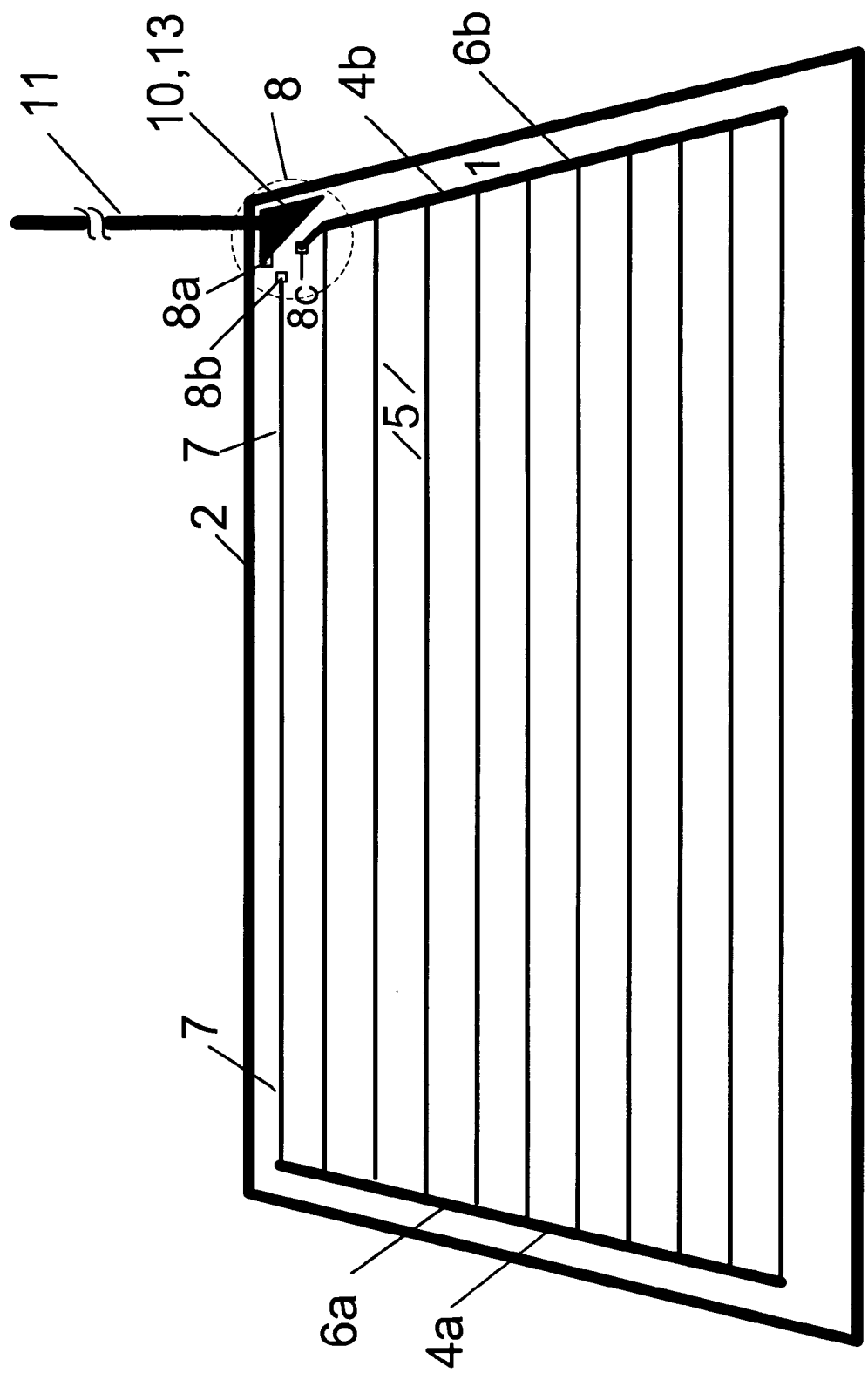
FIG. 7 is a schematic block diagram of an antenna, with antenna connection point and rod antenna with capacitive through-coupling in the vicinity of an upper corner of the window pane.

In FIG. 7, the rod antenna 11 is positioned, as an example, in the vicinity of an upper corner of the window pane, with the capacitive through-coupling 10. Aside from the rod antenna 11, the two bus bars 4a, b are used as diversity antennas. The signal of the bus bars 4a and 4b is passed to the antenna connection point 8 by way of the conductor 7 that is passed parallel to the conductive window edge. A longer feed line from the upper end of the bus bar 4b to the antenna connection point 8 can be eliminated, in advantageous manner. In this view, the different conductors 7 of the heating conductor 5 along with the antenna connection contacts 8a, 8b, 8c and 8d are all disposed inside an antenna connection point region 8.

Figure 8:
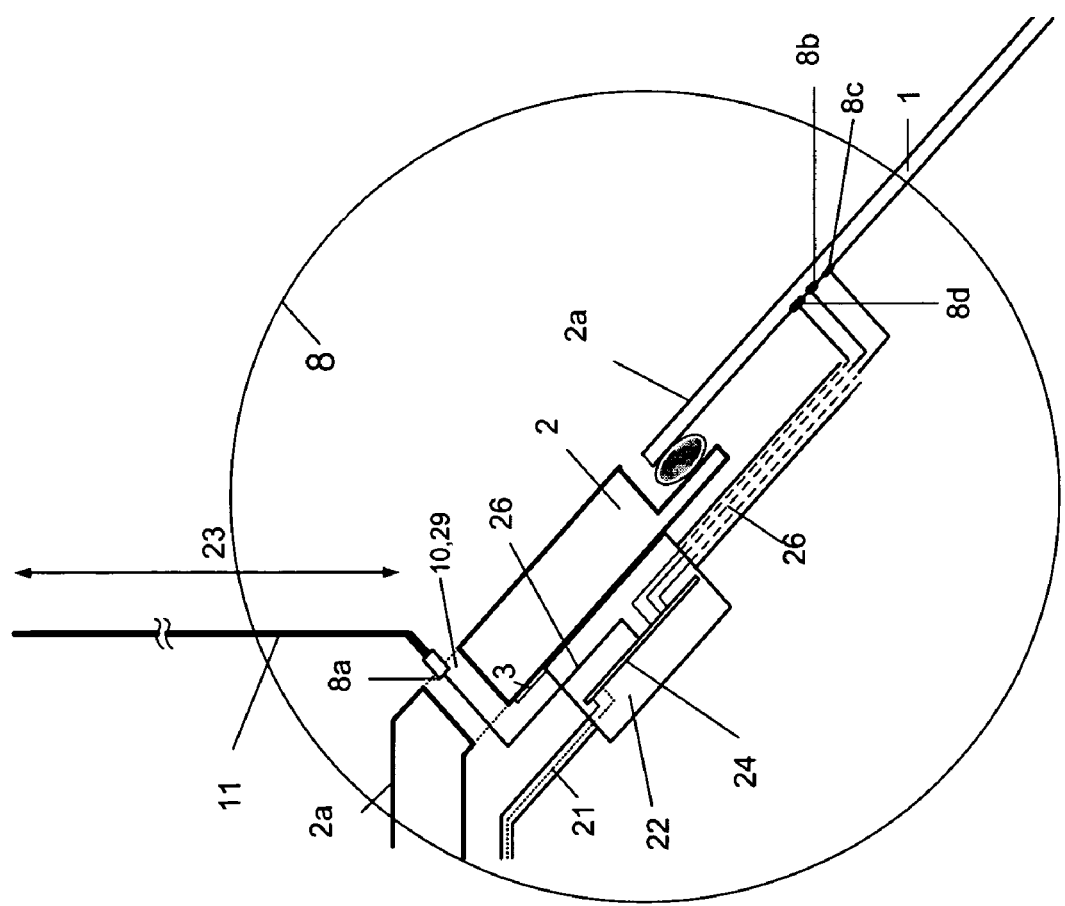
FIG. 8 is a cross sectional view of the antenna system, with a rod antenna affixed to the vehicle roof.

FIG. 8, shows a cross sectional view wherein the rod antenna 11 is affixed in the foot point on the conductive vehicle outer skin 2a, with its antenna connection contact 8a. The reception signal is passed to the antenna module 22 in the interior of the vehicle by way of a simple perforation through-coupling 29. A multiple connection line 26 can be used for feeding in the antenna signals located on the window pane, which line is soldered onto the antenna connection contacts 8b, 8c, 8d on the window pane. However, the plug connection between this line and the antenna module 22 that is unavoidable in practice, and the unavoidable plug connection for connecting the rod antenna 11 make the previously mentioned solutions with the antenna module 22 and the rod antenna 11 on the window pane appear more cost-advantageous.

The diversity efficiency, which corresponds to the number of virtually available decorrelated reception signals serves as a measure for the performance capacity of an antenna diversity system. The improvement in reception in the Rayleigh reception field in which interference occurs due to signal collapses (fadings) in multi-path propagation results from the reduction in interference that is frequently caused, in the USW range, by adjacent channels and the same channels, and by noise in weak signal regions. If $p_s$ is the probability of the occurrence of interference in the case of reception with only one antenna in a reception region, then the probability of the occurrence of interference in diversity operation in the same reception region is reduced to $$P_d = p_s^n$$

where n stands for the characteristic variable of the diversity efficiency of the system. This reference value will serve, in the following, to describe the performance capacity of the diversity antenna system. Thus, the goal of achieving the greatest possible diversity efficiency with as little expenditure of technology as possible is being pursued with the present invention.

The differences between antenna directivity diagrams of different antennas results, among other things, from the path difference that occurs with the different antennas, because of their different positions as a function of the angle of incidence of the electromagnetic waves. Of course, this path difference is smaller in the case of windows having small dimensions than in the case of larger windows. Thus, it is desirable, particularly in the case of small windows and a limited number of available diversity antennas, to improve the diversity efficiency by way of the value that occurs when the antenna signals are exclusively available. An improvement can take place by means of the summation of at least two selected antenna signals, in each instance, whereby one of the signals is subjected to phase rotation before summation, in each instance. This brings about the result that the ratio of useful channel signal/adjacent channel interference signal is changed as a function of the set phase angle, by means of the change in the directivity diagram of the sum signal connected with this. In this connection, the surprising effect is obtained that a discrete division of the angle space of 2 for making available signals superimposed with different phases does not bring any further improvement beyond a limited number. In particular, in the case of same channel or adjacent channel interference that frequently occurs, a diversity system designed accordingly to minimize interference selects a phase setting that yields the maximal signal/noise ratio.

Figure 9:
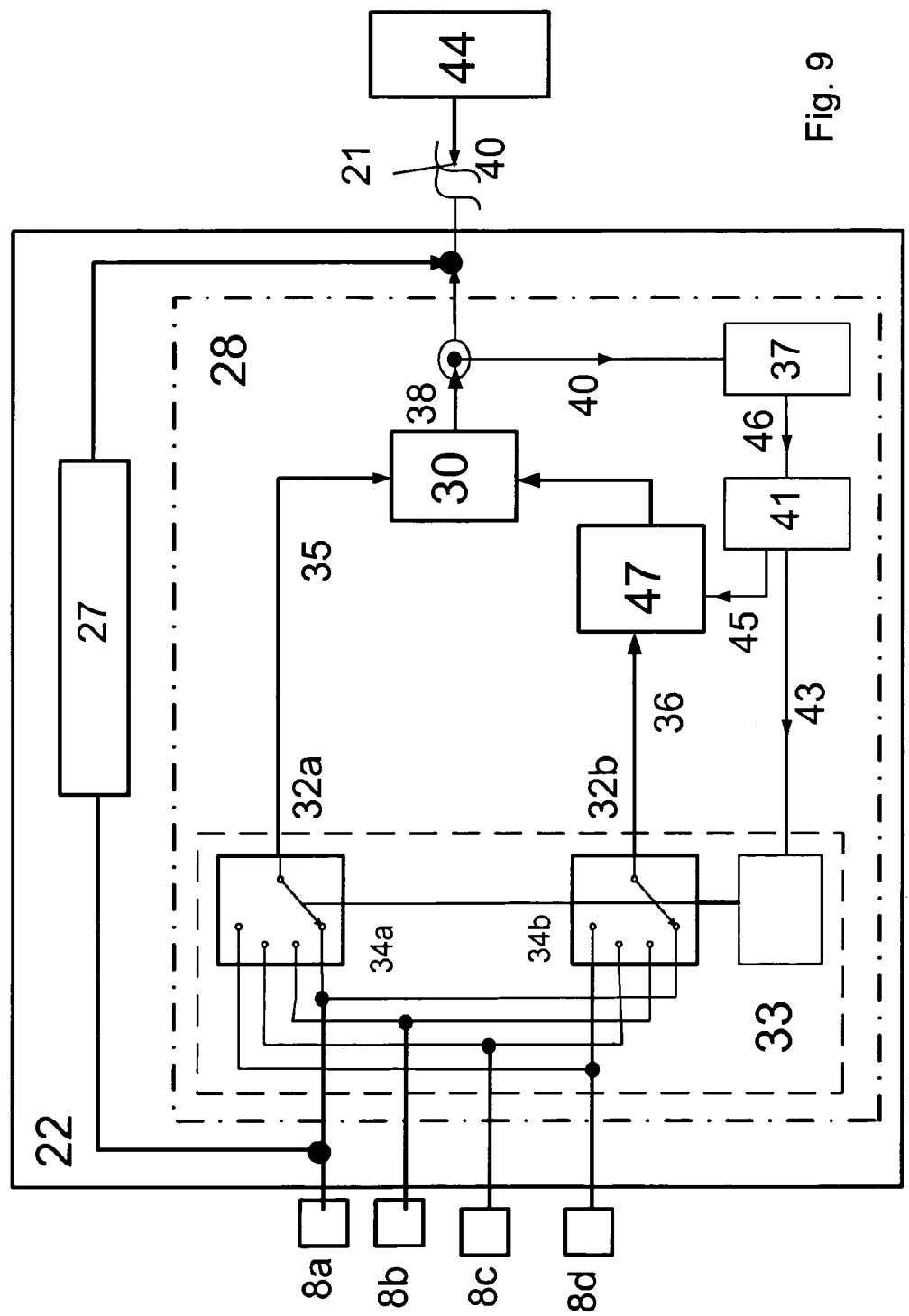
FIG. 9 is an antenna module with antenna diversity block for frequencies above the high-frequency range, with branching of the input-side signal path into two separate signal.

FIG. 9 shows a schematic block diagram of an antenna diversity module 22 which is designed to improve the diversity efficiency of an antenna. In this view there are antenna connection contacts 8a, 8b, 8c and 8d which are electrically coupled to selection switches 34an and 34b, wherein these selection switches are for passing two separate reception signals 32a, 32b, down a first separate signal path or a second separate signal path 36. By branching the input-side signal path, two separate signal paths 35, 36 with input-side selection switches 34a, 34b are created, whereby an increase in the diversity efficiency in the output signal 38 is brought about by way of an adjustable phase rotation device 47 in one of the two signal paths, for example in signal path 36, the phased superimposition of the reception signals 32a, b in the summation element 30. Control takes place by way of the diversity processor 37, to which the reception signals are passed from the receiver 44, in the form of the FM IF [intermediate frequency] signal 40, in combination with the electronic control device with memory 41 and the addressable signal selection switch 33. Such a system can be configured in such a manner that it yields the maximally available signal/noise ratio in the sum signal 38 at a limited value supply of settings of the phase rotation device 47. Reception signals of the rod antenna 11 at the antenna connection contact 8a in the low frequency range are transmitted to the shielded HF line 21 by way of the transmission path for LMS signals 27.

Figure 10:
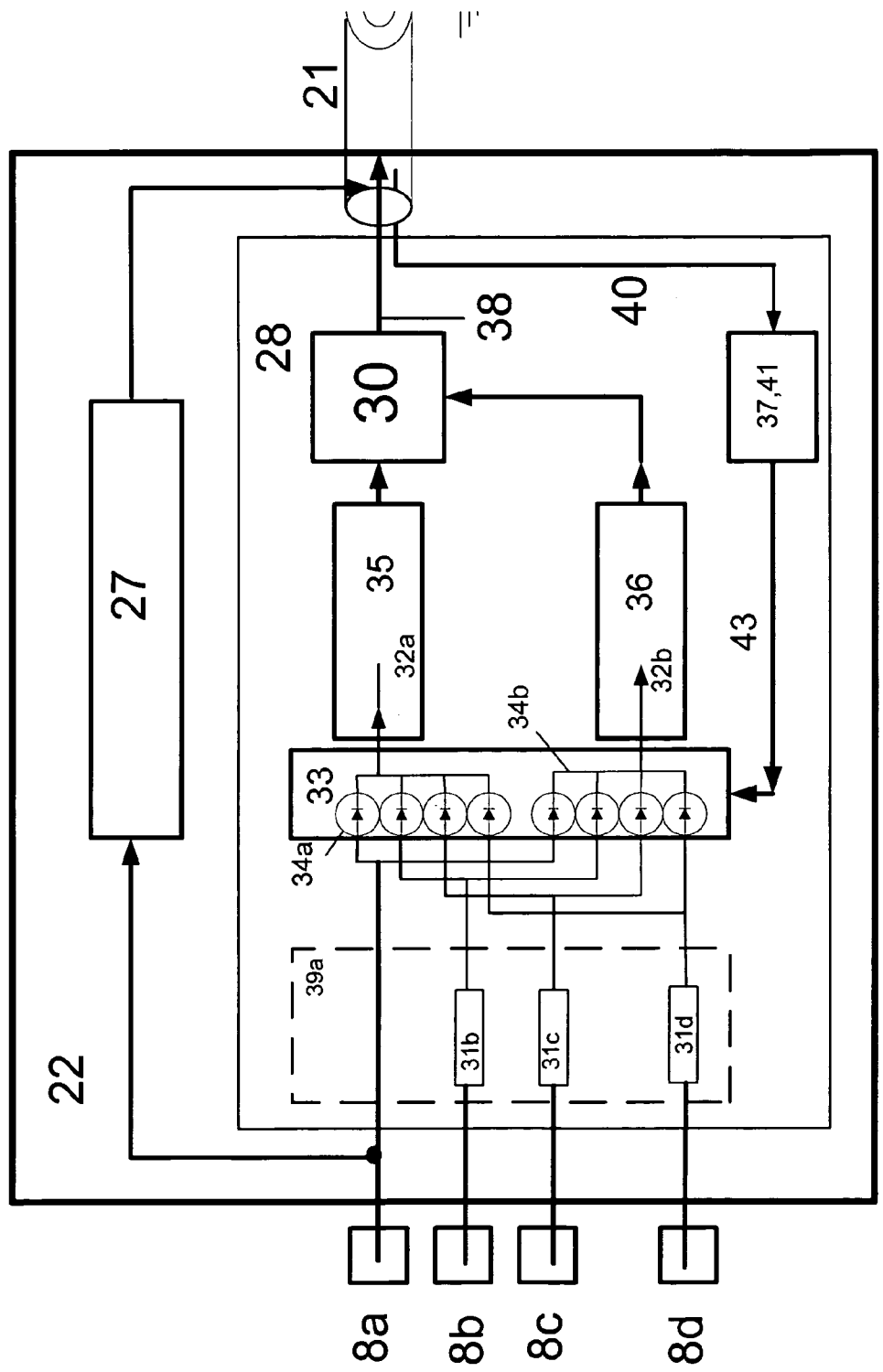
FIG. 10 is an antenna module 22 as in FIG. 9, but with phase rotation elements set in fixed manner in the input-side signal path.

FIG. 10 shows another efficient possibility of increasing the diversity efficiency can be achieved with a modified form of the assembly indicated in FIG. 9. FIG. 10 provides for phase rotation elements 31b, 31c, 31d set in fixed manner in the input-side signal path 39a of the antenna module 22. On the basis of the differences in the antenna directivity diagrams, in terms of amount and phase, another additional 6 different directivity diagrams can be formed in the summed signal 38, in addition to the directivity diagrams of the antennas themselves, by means of combinations of the antenna signals, formed in pairs. The signals of the individual antennas and the combinations can be selected, in targeted manner, by means of corresponding control of the addressable signal switch 33 by way of the electronic control device with memory 41. If the diversity processor 37 is configured accordingly, in combination with the electronic control device with memory 41, a ranking list concerning all the possible settings of the addressable signal switch 33 can be drawn up and continuously updated, with regard to signal quality, so that the best available signal/noise ratio is always present at the output of the antenna module 22. In this connection, the surprising effect is shown that a fixed angle value for the phase rotation can be determined for the phase rotation elements 31b, 31c, 31d, for every frequency, in each instance, so that a statistically optimal value for the diversity efficiency is obtained during all travel in different Rayleigh reception fields in which interference occurs due to multi-path propagation, with a statistical distribution of the incident waves by size and direction. The particular advantage in this connection is that the phase rotation elements 31b, 31c, 31d—even taking the frequency dependence of these optimal phase values into account—can be implemented by means of simple LC circuits, and the gain in diversity efficiency can be achieved with extremely little hardware expenditure. The gain that can be achieved is all the greater, the greater the differences between the antenna directivity diagrams. Therefore it is particularly helpful that according to the invention, in addition to the antennas on a small window pane, one of the antennas is configured as a rod antenna 11 with its clearly different reception behavior.

Figure 11:
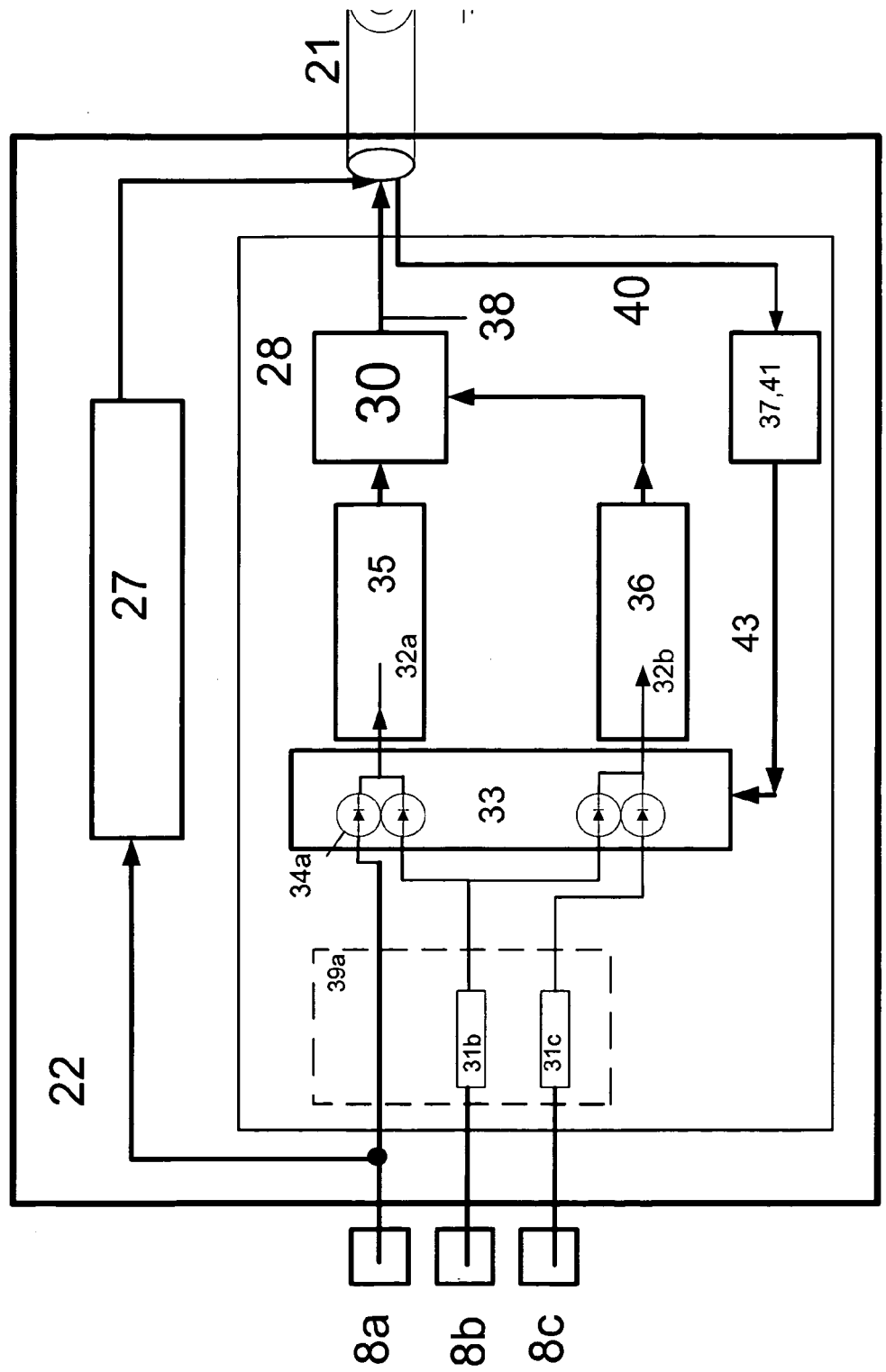
FIG. 11 is a schematic block diagram of an antenna module as in FIG. 9, but for only three antenna connection contacts and two phase rotation elements.
Figure 12A:
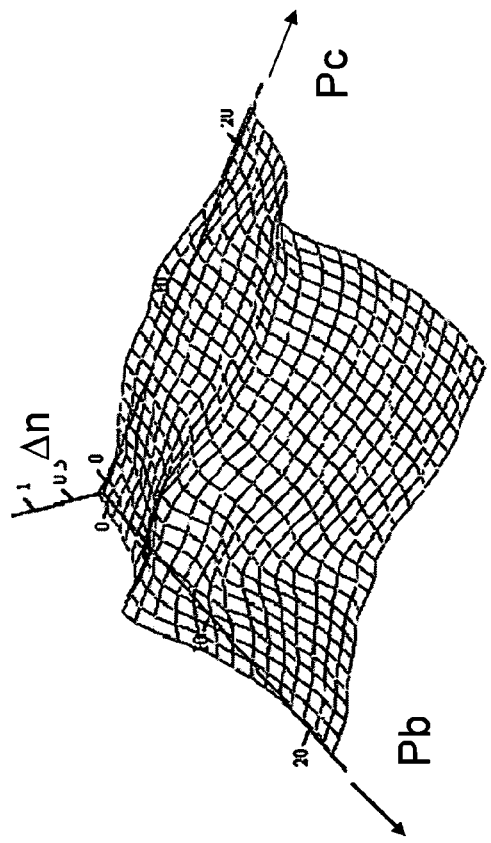
FIGS. 12A and 12B are a three-dimensional representation of the increase in diversity efficiency.
Figure 12B:
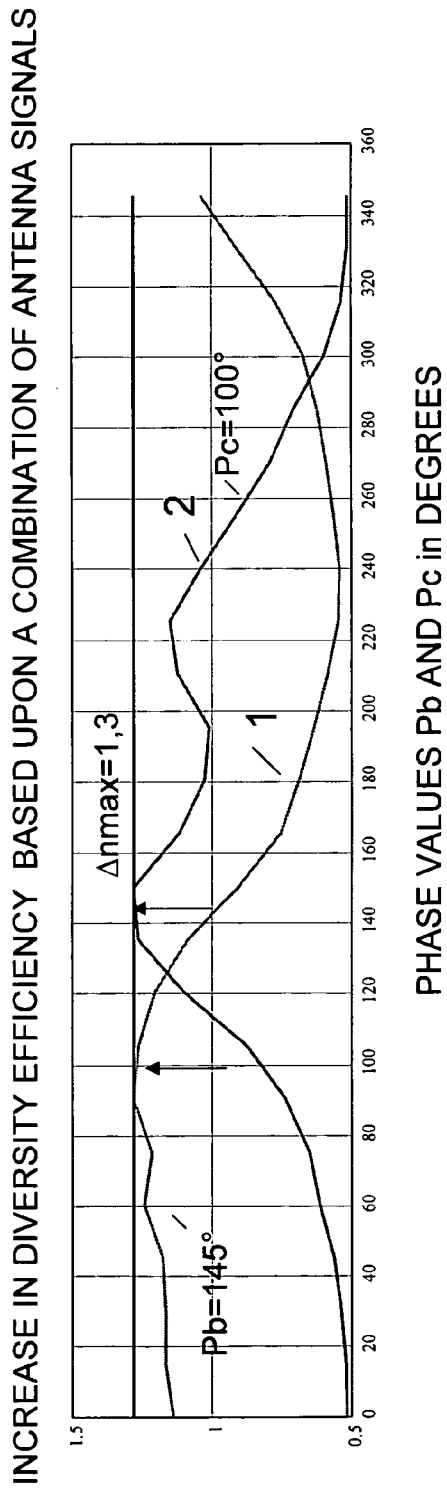

This is impressively evident from the following example, shown in FIG. 11, with only three antennas. For this purpose, only two phase rotation elements 31b, 31c are required. The addressable signal selection switch 33 for switching through the individual antenna signals, and for forming the three possible combinations of antenna signals, requires only four diodes in the addressable signal selection switch. The diversity efficiency of three antennas was determined as being n=2.3 for an example. In FIG. 12a, the gain Δn in diversity efficiency is shown in three dimensions as a function of the phase values Pb and Pc. In this case, a clearly marked maximum is shown at an optimal selection of the two phase values. To make this effect clear, sections through the diagram in FIG. 12a are shown in FIG. 12b; they contain the point for maximal gain Δnmax in diversity efficiency, in each instance. In the example, shown, Δnmax=1.3. The effect of this gain can be made clear for the following reception situation, given as an example: In a reception region in which the probability of interference is 20% with a single antenna, the probability of interference without using the phased summation of signals is reduced to the value of 2.5%. At Δnmax=1.3, this probability of interference is reduced by practically another order of magnitude, to 0.3%, with little effort and expenditure.

LIST OF REFERENCE SYMBOLS

Motor vehicle window pane 1
Conductive vehicle body 2
Outer skin of vehicle 2a
Ground connection 3
Bus bar 4a, b
Heating conductor 5
Antenna conductor (first conductor parts) 6a, b, c, d
Conductor 7
Antenna connection point region 8
Antenna connection contact 8a, 8b, 8c, 8d
Connection point 9
Through-coupling 10
Rod antenna 11
Window edge 12
Planar conductive antenna foot point 13
Capacitive counter-surface 14
Bus bar connection 15, 16
Uncoupling networks 17

Output connection 20
Shielded HF line 21
Antenna module 22
Rod length 23
Circuit board 24
Conductive connections 25
Connection line 26
Transmission path for LMS signals 27
Antenna diversity module 28
Perforation through-coupling 29
Summation element 30
Phase rotation element 31b, 31c, 31d
Reception signal 32a, b
Addressable signal selection switch 33
Selection switch 34a, 34b
First separate signal path 35
Second separate signal path 36
Diversity processor 37
Summed output signal 38
Input-side signal path 39a
FM IF signal 40
Electronic control device with memory 41
Logical switching setting signal 43
Receiver 44
Phase setting signal 45
Interference display signal 46
Phase rotation device that can be set 47

Accordingly, while only a few embodiments of the present invention have been shown and described, it is obvious that many changes and modifications may be made thereunto without departing from the spirit and scope of the invention.

What is claimed is:

1. An antenna system for radio reception, being disposed in a motor vehicle window comprising:
   a) an imprinted heating field formed in said motor vehicle window, comprising a plurality of heating conductors and a plurality of bus bars;
   b) a plurality of antenna connection contacts;
   c) at least one antenna formed by connecting said imprinted heating field to at least one antenna connection contact of said plurality of antenna connection contacts via at least one conductor of said plurality of heating conductors;
   d) a rod antenna mounted on an outer side of the motor vehicle;
   e) an electrical through coupling, coupled at one end to said rod antenna, wherein reception signals are conveyed along said electrical through coupling into an interior of the motor vehicle for reception of signals both for relatively low frequencies and above a high frequency range,
   f) an antenna connection point region having a diameter that is smaller than 1/15 of a wavelength in said high frequency range, wherein said at least one antenna connection contact, and said at least one additional connection contact are disposed within said antenna connection point region;
   g) a ground connection to the motor vehicle body disposed in said antenna connection point region;
   h) an antenna module disposed within said antenna connection point region and within an interior region of the motor vehicle, said antenna module comprising electronic components including signal amplifiers for signal amplification in both said relatively low frequency and above said high frequency range, for reception signals from said at least one antenna connection contact and said at least one additional antenna connection contact;
   i) a plurality of connection lines for allowing said reception signals from said at least one antenna connection contact and said at least one additional antenna connection contact to flow to said antenna module, wherein said reception signals are also passed to said ground connection; and
   j) a shielded HF line for passing output signals in both said relatively low frequency range and said relatively high frequency range to said antenna module.

2. The antenna system as in claim 1, wherein said rod antenna further comprises a planar conductive foot point that is coupled to an outside surface of the window, wherein the antenna system further comprising a capacitive counter surface which is formed on an opposite inside surface of the window, and coupled to said at least one additional antenna connection contact, for providing capacitive through coupling of said reception signals into an interior of the vehicle.

3. The antenna system as in claim 2, wherein said antenna connection point region and said rod antenna with capacitive through coupling are affixed approximately in a horizontal center region of the window pane, wherein at least one of said plurality of bus bars is used as a first antenna conductor, wherein said at least one conductor of said plurality of conductors is formed as a second antenna conductor, which is guided substantially parallel to an upper window edge wherein said antenna connection contacts are formed inside of the window pane.

4. The antenna system as in claim 3, wherein said first antenna conductor is formed in said approximately horizontal center region of the window pane, and wherein an intersection point of the uppermost heating conductor is disposed in said antenna conductor point region.

5. The antenna system as in claim 3, further comprising two first antenna conductors which are disposed parallel to each other and are guided approximately symmetrical to a horizontal center of the window pane, and wherein said two first antenna conductors are connected to each other by two additional antenna conductors, wherein said first antenna conductors and said second antenna conductors are jointly connected with at least one antenna connection contact of said plurality of antenna connection contacts.

6. The antenna system as in claim 3, wherein said antenna connection point region, said rod antenna, and said capacitive through coupling are affixed to a corner of the window pane, and wherein at least one of said plurality of bus bars is used as a first antenna conductor, wherein at least one bus bar of said plurality of bus bars lies away from said antenna connection point region so that a second antenna conductor part is guided essentially parallel to the upper window edge, to bridge a distance, wherein in a case of a bus bar of said plurality of bus bars that is disposed closer to said antenna connection point region, said closer bus bar is coupled to at least one antenna connection contact of said plurality of antenna connection contacts in a conductive manner.

7. The antenna system according to claim 6, wherein said antenna module is affixed on the vehicle body, and the reception signals of the rod antenna and of said at least one antenna situated on the window pane are passed from said plurality of antenna connection contacts imprinted on the window pane to the antenna module, by way of said plurality of connection lines.

8. The antenna system according to claim 7, wherein said plurality of connection lines are configured in the form of a multiple line, and the connection of the multiple line is firmly connected with the plurality of antenna connection contacts at one end, and its other end is connected with a plug connection with said antenna module, and said ground connection is provided by way of mechanical attachment of said antenna module to said vehicle body.

9. The antenna system as in claim 1, wherein said antenna module is disposed inside the window pane, and wherein conductive connections are produced between said plurality of antenna connection contacts which are imprinted on the window pane, and wherein said antenna module comprises electronic signal amplifiers for amplifying signals in both frequency ranges and for antenna diversity function.

10. The antenna system as in claim 1, wherein said rod antenna is affixed on the outer surface of the electrically conductive vehicle body, and the through-coupling of the reception signals into the interior of the vehicle is configured as a perforation through-coupling, and wherein said reception signals are passed on to said antenna module by way of at least one of said plurality of said connection lines.

11. The antenna system according to claim 10, wherein said antenna module is coupled to the conductive vehicle body, and the reception signals for the frequency range above the high-frequency range are passed from said plurality of antenna connection contacts imprinted onto the window pane to the antenna module by way of said plurality of connection lines.

12. The antenna system as in claim 11, wherein said antenna diversity module has a switching device for selecting a different reception signal, in terms of diversity, and an evaluation circuit; and wherein the antenna system further comprises a receiver, wherein said evaluation circuit evaluates the quality of the reception signal just reaching said receiver, to guide a different reception signal, in terms of diversity, to said receiver, if interference occurs, wherein the device further comprises:
 a plurality of separate signal paths comprising at least one first separate signal path and at least one second separate signal path both disposed in said antenna diversity module;
 at least one summation element;
 at least one branching input-side signal path, wherein output signals of which are passed to at least one input of said summation element, and summed up in said at least one summation element whereby a summed signal is passed to said receiver by way of said shielded HF line;
 an addressable logical signal selection switch disposed on an input side of said first signal path and second signal path, wherein said addressable logical signal selection switch is connected with said plurality of antenna connection contacts, and with the different switching positions of which a different antenna reception signal, in terms of diversity, in each instance, is guided to at least one of the two inputs of said separate signal paths;
 a phase rotation device disposed along at least one of said signal paths, said phase rotation device having a fixed setting of a phase angle of rotation, with the effect that when the reception signal of one of said plurality of antenna connection contacts is switched through to one of the two inputs of said summation element in at least one of the switch settings of the addressable logical signal selection switch, a reception signal of another of said plurality of antenna connection contacts is rotated by the phase of said phase rotation device with the fixed setting, and switched through to the other of the two inputs of the summation element, and thereby added to the first signal in the summed signal, wherein when interference occurs in the summed signal, a different coordinated setting of the switching position of said addressable logical signal selection switch, in terms of diversity, is selected.

13. The antenna system according to claim 12, wherein at least one phase rotation element, which is set in fixed manner, is included in the input-side signal path for rotating the phase angle of an antenna signal, in the feed line to the addressable logical signal selection switch, to increase the diversity efficiency.

14. The antenna system according to claim 13, wherein when three antenna connection contacts are present, there are only two phase rotation elements set in fixed manner and disposed along said input-side signal path, wherein the phase rotation angles are selected as a function of frequency, for the greatest possible increase in diversity efficiency—with reference to the value without the phased summation of reception signals.

15. The antenna system according to claim 14, wherein a separate transmission path for the reception of AM signals is configured for the amplification and transmission of signals in the antenna module, the input signal of which is obtained from the antenna connection contact of said rod antenna, and the output signal of which is passed to said shielded HF line.

16. The antenna system according to claim 15, wherein a plurality of antennas are formed from the heating field, in such a manner that an imprinted antenna conductor is present, in each instance, which is guided crosswise to said plurality of heating conductors and connected with said plurality of heating conductors at the intersection points, and a second part of the imprinted antenna conductor is conductively connected with said related first conductor part, and is guided essentially parallel and as close as possible to the conductive upper window edge of the electrically conductive vehicle body, to bridge the distance to the plurality of antenna connection contacts imprinted on the window pane.

17. The antenna system according to claim 1, further comprising:
 a phase rotation device set in fixed manner, and disposed along at least one of two separate paths, wherein said phase rotation device has a phase rotation angle of which, is set in fixed manner, and is changed by means of diversity switching, in each instance;
 wherein said antenna diversity module further comprises an addressable logical signal selection switch on the input side, by means of the different diversity switching positions of which a different reception signal, reaches at least one of the two inputs of the separate signal paths, in each instance, whereby on the output side, the summed signal is passed to the receiver by way of the shielded HF line,
 an electronic control device having memory disposed in said antenna diversity module, said electronic control device for coordinated setting of discrete phase rotation angles i of said phase rotation device, which is assigned in fixed manner to a specific switching position of the addressable logical signal selection switch, in each instance, and stored in the memory of the electronic control device as a phase vector (i=1, 2, . . . ), thereby causing a phase value matrix of discrete phase rotation angles (a, b, i) to be stored in the control device, by way of the different switching positions,
 wherein if interference occurs in the summed signal at which an interference display signal is passed to said electronic control device with memory, said electronic control device with memory selects a different coordinated setting of the switching position of the addressable logical signal selection switch, in terms of diversity, and of the related discrete phase rotation angle a, b, i.

18. The antenna system as in claim 1, wherein said antenna module amplifies signals in said relatively low frequency range in an AM radio frequency range.

19. The antenna system as in claim 1, wherein said antenna module amplifies signals above said high frequency range in a FM radio frequency range.

* * * * *